United States Patent [19]

Hackler et al.

[11] 4,444,532

[45] Apr. 24, 1984

[54] METHOD OF, AND APPARATUS FOR, CHARGING PARTICULATE MATTER INTO A GAS STREAM

[75] Inventors: Erich Hackler, Essen-Kettwig; Joachim Meckel, Heiligenhaus; Dietrich Wagener; Manfred Galow, both of Essen, all of Fed. Rep. of Germany

[73] Assignees: Bergwerksverband GmbH; Didier Engineering GmbH, both of Essen, Fed. Rep. of Germany

[21] Appl. No.: 421,116

[22] Filed: Sep. 20, 1982

Related U.S. Application Data

[63] Continuation of Ser. No. 190,822, Sep. 25, 1980, abandoned.

[30] Foreign Application Priority Data

Sep. 27, 1979 [DE] Fed. Rep. of Germany ....... 2939029

[51] Int. Cl.[3] .............................................. B65G 53/42

[52] U.S. Cl. .................................. 406/117; 34/57 R; 406/108; 406/195

[58] Field of Search ............... 406/108, 117, 153, 194, 406/195; 34/57 R, 10; 432/14, 58

[56] References Cited

U.S. PATENT DOCUMENTS

| | | | |
|---|---|---|---|
| 2,898,157 | 8/1959 | Hallworth | 406/108 X |
| 3,197,258 | 7/1965 | Cross, Jr. | 406/108 X |
| 3,306,672 | 2/1967 | Kleiner et al. | 406/153 |
| 3,309,785 | 3/1967 | King | 406/108 X |
| 4,010,551 | 3/1977 | Rohde | 406/195 X |

FOREIGN PATENT DOCUMENTS

| | | | |
|---|---|---|---|
| 846653 | 8/1960 | United Kingdom | 406/108 |

*Primary Examiner*—Jeffrey V. Nase
*Attorney, Agent, or Firm*—Michael J. Striker

[57] ABSTRACT

Small, pourable particles of comminuted coal for coking purposes are gravity-discharged into a stream of hot gas flowing upwardly in a flight stream tube, in a direction inclined and generally opposite to the gas flow direction. Just prior to entry into the gas stream the particles are fluidized so that, on being entrained by the gas stream, they will become uniformly distributed throughout the cross-section of the same. A method and an apparatus are disclosed.

1 Claim, 2 Drawing Figures

METHOD OF, AND APPARATUS FOR, CHARGING PARTICULATE MATTER INTO A GAS STREAM

This is a continuation of application Ser. No. 190,822, filed Sept. 25, 1980, now abandoned.

BACKGROUND OF THE INVENTION

The present invention relates generally to the charging of particulate matter into a gas stream.

More particularly, the invention relates to a method of charging particulate matter, such as small coal particles, into a gas stream, such as a gas stream flowing in a flight stream tube.

The invention also relates to apparatus for carrying out the method.

In modern coke-making it is becoming increasingly common to use preheated coal particles for the coke oven charge. There are various reasons for this, one of these being that this technique permits the use of poor coking coal, i.e. of coal which inherently does not have good coking characteristics.

The coal to be preheated is comminuted to small particle size and is then admitted in moist condition into a preheating installation, for example an upright flight stream tube, in which it is dried and preheated to temperatures of about 100°-500°, preferably about 300° C. The preheating and drying can be carried out in a single stage, in dual stages or in multiple stages; it is accomplished by contacting the coal particles with hot heat-carrier gases which release their sensible heat to the coal particles and are then wholly or in part discharged to atmosphere.

A significant problem encountered in this coal treatment resides in the lack of uniformity of coal-particle distribution throughout the heat-carrier gas stream. To obtain uniform and acceptable results, a uniform charging of coal particles into—and distribution thereof in—the gas stream is of great importance in each and every drying and preheating stage, respectively. When flight stream tubes are used, the uniformity of coal distribution in the gas stream flowing in the tube is the more important, the shorter the tube is. Real reliability of uniform coal distribution in the gas stream has not heretofore been attained; rather, due to a "separation" phenomenon a condition occurs in which there are concentrations of coal in some parts of the gas stream cross-section and little, if any, coal in other parts thereof. The result is differential heating of different parts of the tube wall, leading to twisting and buckling of the tube and ultimately resulting in substantial damage to the same.

A proposal to mitigate this problem has been made in German Allowed Application DE-AS No. 2,427,932 according to which the flight stream tube is provided with a constriction formed by a tube section of rectangular cross-section, one of the two longer sidewalls of which is provided over its entire width with a charging inlet for the coal particles. Downstream of the constriction the tube is provided with a diffusor, the cross-section of which changes in downstream direction from rectangular to circular shape. This construction provides certain advantages, but it still does not prevent the aforementioned separation with its disadvantageous consequences.

SUMMARY OF THE INVENTION

It is, accordingly, an object of the present invention to overcome the prior-art disadvantages.

A more particular object of the invention is to provide a novel method of charging particulate matter into a gas stream—especially of charging coal particles into a gas stream flowing in a flight stream tube—in such a manner as to avoid the prior-art difficulties.

A still more specific and equally important object of the invention is to provide a method of the type under discussion, which assures as uniform as possible a distribution of the particulate material over the cross-section of the flight stream tube, irrespective of fluctuations in the characteristics of the particulate material itself (e.g. its moisture content or its particle size) and/or of the stream of heat carrier gas (e.g. its flow speed). This is to prevent local overheating of the flight stream tube wall and assure uniform drying and heating of the particulate material.

A concomitant, and no less important object of the invention, is to provide an improved apparatus for carrying out the method and for avoiding the prior-art difficulties.

Pursuant to these objects, and still others which will become apparent hereafter, one aspect of the invention resides in a method of charging particulate matter into a stream of gas, particularly of charging coal particles into a flight stream tube for drying and preheating therein, comprising the steps of confining a stream of gas to flowing in a path in one direction; feeding pourable particulate material towards the path in another direction inclined and generally counter to the one direction; and fluidizing the particulate material just prior to entry into the path, thereby to enhance the entrainment of the particulate material and facilitate its uniform distribution throughout the cross-section of the stream of gas.

Another aspect of the invention resides in apparatus for charging particulate matter into a stream of gas, particularly for drying and pre-heating coal in a flight stream tube, comprising means for confining a stream of gas to a predetermined flow path; means for feeding pourable particulate material towards the flow path in a direction inclined and generally counter to the flow direction of the stream of gas; and means for fluidizing the particulate material just prior to entry thereof into the flow path, so as to enhance the entrainment of the particulate material and facilitate its uniform distribution throughout the cross-section of the stream of gas.

The gist of the invention is that heat carrier gas—with or without flow regulation—is supplied from below to a lower discharge end of the chute or other path in which the particles are fed by gravity into the flight stream tube. As a result, the flow of particles is, in effect, fluidized immediately prior to the entry of the particles into the gas stream in the flight stream tube. The density of the flow of particles is thereby reduced, resulting in a more ready and uniform entrainment of the particles by, and mixing thereof with, the stream of gas in the tube. Moreover, this advantage is obtained independently of e.g. moisture content (or fluctuations thereof) of the particles. By regulating the flow of gas supplied from below to the outlet of the particle path, the system can without difficulty be accommodated to differing flow speeds of the gas stream in the tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
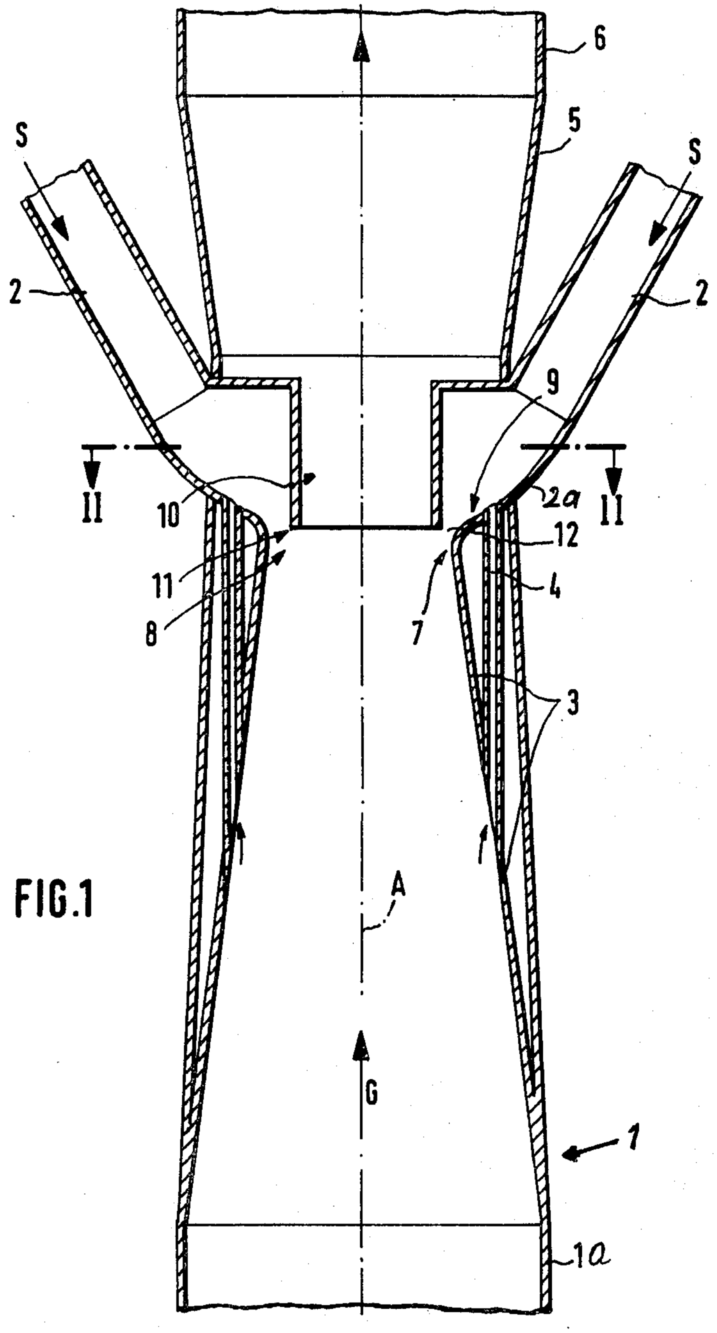
FIG. 1 is a somewhat diagrammatic, fragmentary vertical section through an apparatus embodying the invention.
Figure 2:
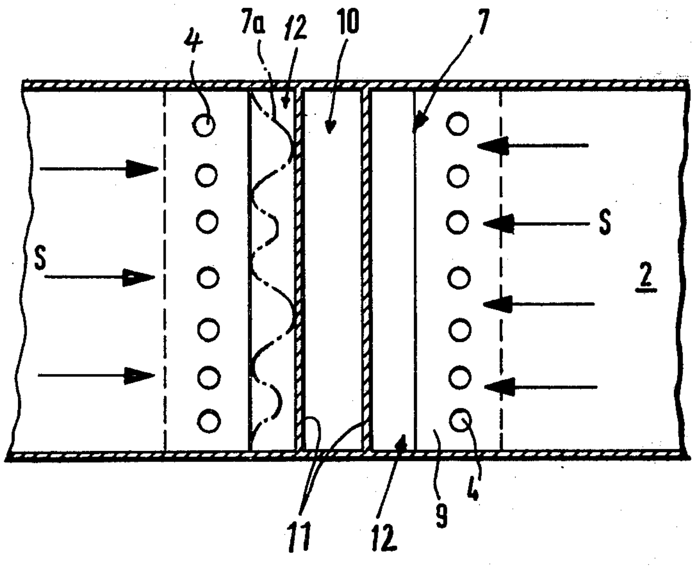
FIG. 2 is a section taken on line II—II of FIG. 1.

An exemplary embodiment of an apparatus according to the invention is illustrated in FIGS. 1 and 2. Both the apparatus itself, and the inventive method which can be practiced with it, will hereafter be conjointly described with reference to these Figures.

An upright flight stream tube 1 is shown in FIG. 1. It receives in known manner a stream of hot gas G which travels upwardly in it, lengthwise of the axis A of the tube. The gas stream G is to entrain, dry and preheat (or dry or preheat, depending upon whether the operation is be carried out in one or more stages=one or more flight stream tubes) particulate material, such as finely comminuted particles of moist coal. The particulate material S is admitted into the tube 1 via two oppositely located feed chutes or pipes 2 through which the material S slides under the influence of gravity. The longitudinal axes of the pipes 2 are transversely inclined with reference to the axis A of tube 1 and the material S is discharged into the tube 1 in direction generally opposite to the flow of gas G, into a constricted area 8 of rectangular cross-section.

Opposite the outlet ends of the pipes 2 the inner cross-section of tube 1 is reduced by walls forming a passage of rectangular cross-section (FIG. 2) and upwardly of this passage the tube 1 has a conically divergent diffuser section 5 which finally merges with a tube section 6 of circular cross-section and of a diameter corresponding to the illustrated (FIG. 1) circular cross section 1*a* of tube 1.

Installed in the section of tube 1 which extends from section 1*a* to the lower edge 11 of the wall forming the passage 10, is a circumferential wall 3 which converges in direction towards this lower edge 11 and the upper end of which forms the rectangular-cross section area 8. The wall portions 2*a* of the pipes 2 are inclined less steeply to the horizontal than the remainder of the pipes 2, and these portions 2*a* each merge into a discharge section 9 which is still less steeply inclined. The sections 9 have free edge portions 7 or 7*a* which define with the lower edge 11 of the wall forming the passage 10 respective narrow discharge gaps 12 which are elongated and extend along opposite sides of the passage 10 (FIG. 2). As FIG. 2 also shows, the edge portions 7 may be straight or they may, as shown at 7*a*, be regularly or irregularly profiled. These measures relating to the shapes of portions 7, 7*a* can be combined in the apparatus, or any one of them can be used by itself.

At opposite sides of the axis A there are series of conduits 4 which extend substantially parallel to the axis A and have inlets located in the convergent wall 3 and outlets located in the respective discharge sections 9 of the pipes 2. A portion of the heat carrier gas stream G enters these conduits 4 and emerges at the discharge section 9 over which the particulate material slides towards the edge portions 7, 7*a*. As a result, the particulate material in sections 9 is fluidized (analogous to a fluidized bed) immediately prior to its discharge via the gaps 12 into the main gas stream G.

The gas stream G entrains these fluidized particles—this operation resembles a venturi—and subjects them to strong agitation which results in uniform distribution of the particles throughout the cross-section of the gas stream G.

The invention is susceptible of various modifications. For example, it is not absolutely necessary to accelerate the gas stream G at or in the region of the gaps 12; in that case, the wall 3 need not be convergent or might not even be provided at all. The conduits 4 would then be provided externally of the flight stream tube 1, but would of course still discharge at the sections 9. In place of heat carrier gas G, the conduits 4 could in this case be connected with a separate gas supply, except that feeding them from the gas stream G is of course the simplest and most practical way. The omission of the constricting wall 3 is suitable especially in instances when it is assured that the gas stream G in the flight stream tube 1 has a velocity which is sufficiently high in and of itself (i.e. without acceleration due to the constriction) to assure proper entrainment and upwards conveyance of the particles.

The projections formed in the edge portion 7*a* have the advantage, as compared to the straight edge portion 7, that some of the gas from stream G enters behind the particles which are discharged over the edge portion 7*a*. This facilitates entrainment of the particles.

The edge portions 7 and/or 7*a* may also be provided with horizontal corrugations extending parallel to slots 12, or be otherwise shaped to assure that the particles are discharged over them not in form of a continuous veil, but instead in form of intermittent charges or in form of "strands"; this measure further facilitates the proper entrainment and uniform distribution of the particles throughout the cross-section of the gas stream G.

The invention achieves its intended purposes, in that it greatly reduces or all but eliminates the earlier-explained separation effect which otherwise is an inevitable result of the admission of pourable particulate material into a flight streamtube or, more generally, into a gas stream. The deflection of the gas stream G (inwardly towards the channel 10) below the point of admission of the particulate material aids in the goal of obtaining uniform distribution of the material throughout the gas stream cross-section provided that, in accordance with the invention, the particulate material is fluidized in the manner and at the locations herein disclosed.

While the invention has been illustrated and described as embodied in connection with a flight stream tube, it is not intended to be limited to the details shown, since various departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Apparatus for charging particulate material into a stream of gas, for drying and preheating coal in a flight stream tube, comprising means for confining a stream of gas to a predetermined flow path; means for feeding pourable particulate material towards said flow path in a direction inclined and generally counter to the flow direction of said stream of gas and under the influence of gravity, said feeding means including wall means bounding a feeding path and having an inclined wall portion provided with a discharge section which communicates with said flow path, said discharge section having a discharge lip over which the particulate material slides towards said flow path, said lip extending substantially horizontally; and means for fluidizing the particulate material, said fluidizing means including a plurality of fluidizing gas conduits branched off said means for confining a stream of gas and extending towards said discharge section and communicating therewith so as to supply fluidizing gas to and fluidize the particulate material immediately prior to entry thereof into said flow path, so as to enhance the entrainment of the particulate material and facilitate its uniform distribution throughout the cross-section of the stream of gas, said fluidizing gas conduits having outlets which open at said discharge lip of said discharge section, and inlets communicating with said flow path upstream of said inclined wall portion, so that some of the gas of said stream of gas is diverted into said fluidizing gas conduits and at said discharge lip of said discharge section, said confining means including wall means surrounding said flow path over a part of the length thereof and converging toward said discharge lip from a location upstream of said discharge lip, said inlets communicating with said part of the flow path.

* * * * *